United States Patent
Lee et al.

(10) Patent No.: US 12,030,406 B2
(45) Date of Patent: Jul. 9, 2024

(54) COOLANT CIRCULATION SYSTEM FOR A VEHICLE

(71) Applicants: HYUNDAI MOTOR COMPANY, Seoul (KR); KIA CORPORATION, Seoul (KR)

(72) Inventors: Sang Shin Lee, Suwon-si (KR); Man Ju Oh, Yongin-si (KR); Ki Mok Kim, Busan (KR); Dong Kyu Lee, Uiwang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 62 days.

(21) Appl. No.: 17/975,263

(22) Filed: Oct. 27, 2022

(65) Prior Publication Data
US 2023/0294556 A1    Sep. 21, 2023

(30) Foreign Application Priority Data
Mar. 17, 2022 (KR) .......................... 10-2022-0033526

(51) Int. Cl.
*B60L 58/26* (2019.01)
*B60K 11/02* (2006.01)
*B60L 58/27* (2019.01)

(52) U.S. Cl.
CPC .............. *B60L 58/26* (2019.02); *B60K 11/02* (2013.01); *B60L 58/27* (2019.02); *B60L 2240/36* (2013.01)

(58) Field of Classification Search
CPC ......... B60L 58/26; B60L 58/27; B60L 53/302
See application file for complete search history.

(56) References Cited

U.S. PATENT DOCUMENTS

| | | | | |
|---|---|---|---|---|
| 4,444,024 | A * | 4/1984 | McFee ................... | F25B 29/00 62/401 |
| 5,909,099 | A * | 6/1999 | Watanabe ............ | A61K 31/728 320/108 |
| 9,527,403 | B2 * | 12/2016 | Mardall ................. | B60L 53/35 |
| 10,259,333 | B2 * | 4/2019 | Lindholm ........... | H02J 7/00309 |
| 10,882,409 | B2 * | 1/2021 | Nakaso .................. | B60L 53/18 |
| 11,180,044 | B2 * | 11/2021 | Maeshiro .............. | B60L 53/302 |
| 11,292,363 | B2 * | 4/2022 | Shimauchi ............. | B60L 53/16 |
| 11,515,586 | B2 * | 11/2022 | Guerra ................ | H01M 10/663 |
| 11,710,868 | B2 * | 7/2023 | Rogers ................ | H01M 10/486 180/68.1 |
| 11,890,956 | B2 * | 2/2024 | Ding ....................... | B60L 58/24 |

(Continued)

FOREIGN PATENT DOCUMENTS

KR          940015176 A    7/1994

*Primary Examiner* — Nelson J Nieves
(74) *Attorney, Agent, or Firm* — Lempia Summerfield Katz LLC

(57) ABSTRACT

A coolant circulation system for a vehicle performs heat management of a high voltage battery provided in an electric vehicle. The coolant circulation system is configured to be connected to the high voltage battery of the electric vehicle to combine coolant managed outside the electric vehicle and coolant circulated in the high voltage battery of the electric vehicle with each other to supply cooled or heated coolant to the high voltage battery. Thus, the charging efficiency is improved through temperature management of the high voltage battery when the high voltage battery is charged.

17 Claims, 9 Drawing Sheets

(56) References Cited

U.S. PATENT DOCUMENTS

| | | | |
|---|---|---|---|
| 2010/0089669 A1* | 4/2010 | Taguchi | B60L 58/15 |
| | | | 180/65.1 |
| 2013/0029193 A1* | 1/2013 | Dyer | B60L 53/302 |
| | | | 180/65.21 |
| 2015/0306974 A1* | 10/2015 | Mardall | H01M 10/625 |
| | | | 429/120 |
| 2017/0088007 A1* | 3/2017 | Melendez | B60L 53/302 |
| 2017/0088008 A1* | 3/2017 | Melendez | B60L 58/21 |
| 2017/0096073 A1* | 4/2017 | Mardall | B60L 58/24 |
| 2019/0061543 A1* | 2/2019 | Jovet | B60L 53/302 |
| 2019/0241093 A1* | 8/2019 | Shimauchi | H01M 10/613 |
| 2020/0217572 A1* | 7/2020 | Shafir | A23G 9/083 |
| 2021/0013559 A1* | 1/2021 | Lee | B60L 53/18 |
| 2022/0348051 A1* | 11/2022 | Chen | B60L 1/003 |
| 2022/0396165 A1* | 12/2022 | Almkvist | B60H 1/00328 |

* cited by examiner

COOLANT CIRCULATION SYSTEM FOR A VEHICLE

CROSS REFERENCE TO RELATED APPLICATION

The present application claims priority to Korean Patent Application No. 10-2022-0033526, filed Mar. 17, 2022, the entire content of which is incorporated herein for all purposes by this reference.

BACKGROUND

Field of the Disclosure

The present disclosure relates to a coolant circulation system for a vehicle, wherein in order to perform heat or temperature management of a high voltage battery provided in an electric vehicle, the coolant circulation system is configured to be connected to the high voltage battery of the electric vehicle to combine coolant managed outside the vehicle and coolant circulated in the high voltage battery of the vehicle with each other. Thus, cooled or heated coolant is supplied to the high voltage battery.

Description of the Related Art

The development of technologies related to electric vehicles is ongoing. Among these technologies, in particular, in the case of electric vehicles, technologies related to thermal management of high voltage batteries are attracting attention. The high voltage battery, serving to replace or supplement an engine of a conventional internal combustion engine vehicle, is more sensitive to temperature than the engine. When the high voltage battery is overheated, the high voltage battery is easily damaged and the power efficiency is lowered or reduced due to deterioration. Therefore, for efficient thermal management of the high voltage battery, electric vehicles are equipped with high voltage battery coolant lines.

Meanwhile, when a vehicle is driven by the high voltage battery and when the high voltage battery is charged, heat is generated. In particular, the high voltage battery generates more heat during fast charging, and thus the high-voltage battery may deteriorate, or the charging efficiency thereof may be reduced. Furthermore, when the outside temperature is very low, the charging efficiency of the high voltage battery may be reduced.

The foregoing described as the controller and the controlling method of operating a fuel cell is intended merely to aid in the understanding of the background of the present disclosure. The foregoing is not intended to mean that the present disclosure falls within the purview of the related art that is already known to those of ordinary skill in the art.

SUMMARY

In view of the foregoing, there is a need to develop a coolant circulation system for a vehicle. The system is connected to an electric vehicle in a stationary state in a special environment, such as during charging of a high-voltage battery, to exchange coolant with a coolant line and cool or heat the coolant. This arrangement improves the charging efficiency and/or the thermal efficiency of the high voltage battery.

Accordingly, the present disclosure has been made keeping in mind the above problems occurring in the related art.

The present disclosure is intended to provide a coolant circulation system for a vehicle for heat management of a high voltage battery equipped in an electric vehicle. The coolant circulation system is configured to be connected to the high voltage battery of the electric vehicle to combine coolant managed outside the vehicle and coolant circulated in the high voltage battery with each other and to supply cooled or heated coolant to the high voltage battery. Thereby the charging efficiency may be improved by temperature management of the high voltage battery during a charging situation of the high voltage battery.

In order to achieve the above objectives, according to one aspect of the present disclosure, a coolant circulation system for a vehicle is provided. The coolant circulation system includes a heating tank and a cooling tank that may be configured to store coolant therein. The system also includes a coolant line configured to be selectively connected to a battery system of the vehicle and to supply the coolant in both the heating tank and the cooling tank to the battery system. The coolant line includes a coolant valve configured to selectively supply the coolant in both the heating tank and the cooling tank to the battery system. The system also includes a refrigerant line in which refrigerant may be circulated. The refrigerant line includes a compressor, an expansion valve, a heating core provided in the heating tank, a cooling core provided in the cooling tank, and a refrigerant valve configured to change a flow direction of the refrigerant.

The coolant line may include a coupling part connected to the battery system of the vehicle and a water pump configured to circulate the coolant.

The coolant line may be configured to allow the coolant to flow to the coupling part by passing through the heating tank or the cooling tank from the water pump.

The coolant valve may include a first coolant valve and a second coolant valve that may be configured to allow the coolant to selectively flow from the heating tank or the cooling tank to the coupling part.

The refrigerant line may include an external heat exchanger configured to perform heat exchange with outside air.

The refrigerant line may be configured to allow the refrigerant to pass through the heating core or the external heat exchanger, the expansion valve, and the cooling core from the compressor and to be recirculated to the compressor.

The refrigerant valve may be a 6-way valve and be configured to change a flow of the refrigerant so that the refrigerant that has passed through the compressor may selectively flow into one or more of the heating core, the cooling core, and the external heat exchanger.

In response to a rotation position of the refrigerant valve, the refrigerant valve may allow the refrigerant to flow into the compressor and the heating core, and into the heating core and the external heat exchanger and may prevent the refrigerant from flowing into the heating core and the cooling core. Alternatively, the refrigerant valve may allow the refrigerant to flow into the compressor and the external heat exchanger, and into the heating core and the cooling core, and may prevent the refrigerant from flowing into the compressor and the heating core.

The refrigerant valve may include a first refrigerant valve configured to change a flow of the refrigerant between the compressor, the expansion valve, and the heating core, a second refrigerant valve configured to change a flow of the refrigerant between the heating core, the external heat exchanger, and the compressor, and a third refrigerant valve configured to allow a flow of the refrigerant between the compressor and the external heat exchanger.

The expansion valve may include a first expansion valve arranged between the compressor and the external heat exchanger and may include a second expansion valve arranged between the external heat exchanger and the cooling core.

The heating tank may include a heater configured to heat the coolant.

The coolant circulation system may include a controller configured to receive a coolant required temperature of the battery system, to control the coolant valve, the expansion valve, and the refrigerant valve, and to adjust temperature of the coolant supplied to the battery system of the vehicle.

When the battery system of the vehicle requires an increase in temperature of the coolant, the controller may circulate the refrigerant of the refrigerant line. Thus, the coolant in the heating tank may be heated by the heating core and the heated coolant may be supplied to the battery system.

When temperature of the coolant in the cooling tank is equal to or higher than a preset temperature, the controller may allow the battery system of the vehicle to perform a control according to the increase in temperature of the coolant.

The heating tank may include a heater configured to heat the coolant. When the battery system of the vehicle requires an increase in temperature of the coolant and temperature of the coolant in the cooling tank is less than a preset temperature, the controller may limit circulation of the refrigerant in the refrigerant line, operate the heater, and supply heated coolant in the heating tank to the battery system.

When the battery system of the vehicle requires heated coolant and cooled coolant, the controller may circulate the refrigerant of the refrigerant line to heat the coolant in the heating tank by the heating core, and to cool the coolant in the cooling tank by the cooling core, and may selectively supply the coolant in the heating tank or the cooling tank in response to a required coolant temperature of the battery system.

When the battery system of the vehicle requires a cooling of the coolant, the controller may circulate the refrigerant of the refrigerant line so that the coolant in the heating tank and the coolant in the cooling tank may be cooled by the heating core and the cooling core, respectively, and so that the cooled coolant may be supplied to the battery system.

The coolant circulation system for a vehicle, which is configured as described above, is configured to be connected to a high voltage battery of an electric vehicle to combine coolant managed outside the vehicle and coolant circulated in the high voltage battery of the electric vehicle with each other. This arrangement is for the heat management of the high voltage battery equipped in the electric vehicle and to supply cooled or heated coolant to the high voltage battery. Therefore, the charging efficiency may be improved by temperature management of the high voltage battery when the high voltage battery is charged.

BRIEF DESCRIPTION OF THE DRAWINGS

The above and other objectives, features, and other advantages of the present disclosure should be more clearly understood from the following detailed description when taken in conjunction with the accompanying drawings, in which.

DETAILED DESCRIPTION

Figure 1:
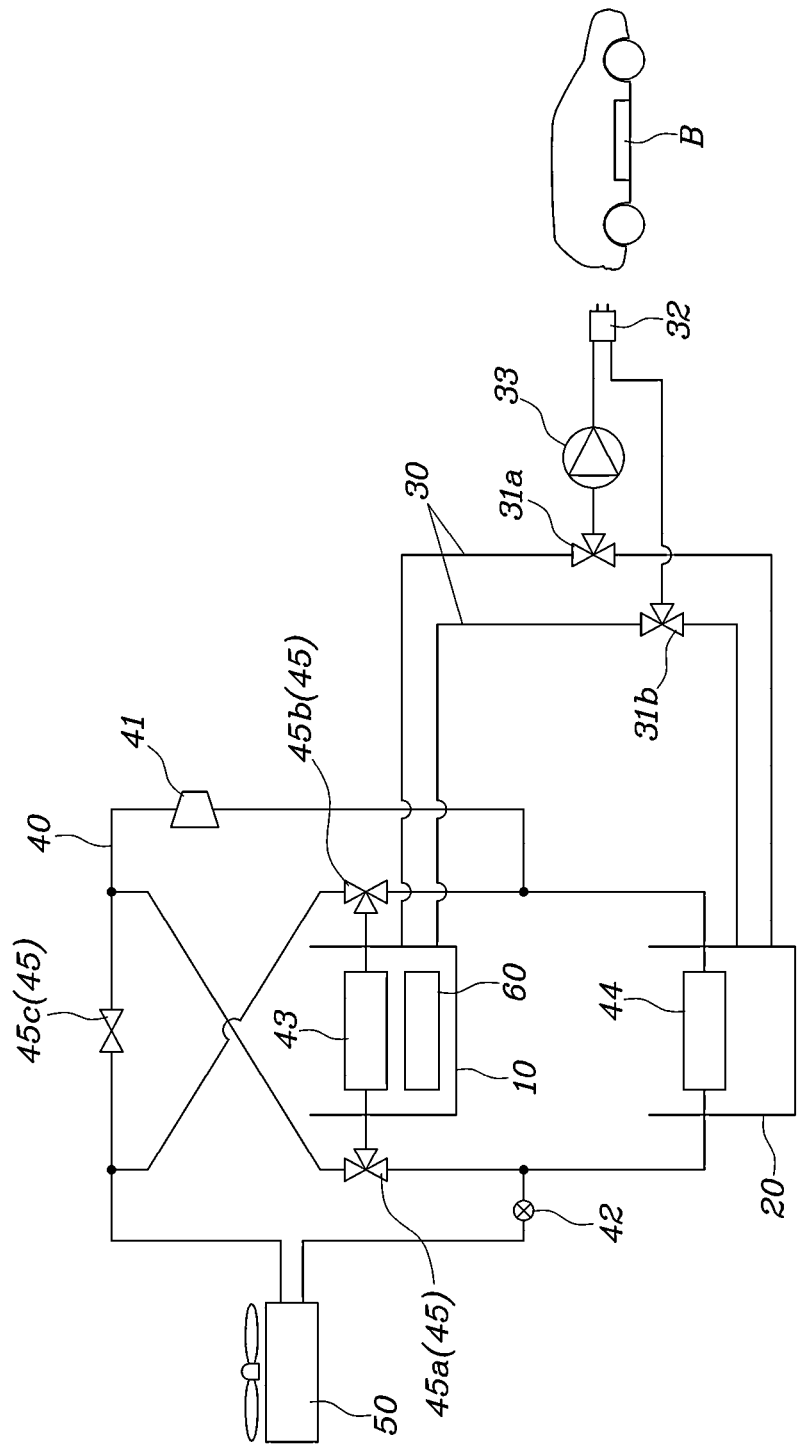
FIG. 1 is a view showing a coolant circulation system for a vehicle according to the present disclosure.

Hereinbelow, a coolant circulation system for a vehicle according to embodiments of the present disclosure is described with reference to the accompanying drawings.

In the following description, the structural or functional description specified to embodiments according to the inventive concept of the present disclosure is intended to describe the embodiments. It should be understood that the present inventive concept may be variously embodied, without being limited to the embodiments disclosed herein.

Embodiments described herein may be changed in various ways and may have various shapes. Specific embodiments are shown in the drawings and are described in detail in this specification. However, it should be understood that the embodiments according to the concept of the present disclosure are not limited to the embodiments described hereinbelow with reference to the accompanying drawings. Instead, it should be understood that modifications, equivalents, and substitutions are included in the scope and spirit of the inventive concept.

Unless otherwise defined, all terms including technical and scientific terms used herein have the same meaning as commonly understood by those of ordinary skill in the art to which the present disclosure belongs. It should be understood that the terms defined by the dictionary should be interpreted as having meanings consistent with the meanings within the context of the related art. Such terms should not be ideally or excessively formally defined unless the context clearly dictates otherwise. An electric vehicle described herein may be a passenger vehicle, such as a car, truck, sport utility vehicle or the like, or may be a personal mobility device, i.e., a mobility, such as an electric scooter, or may be a drone, or other type of mobile apparatus.

Hereinbelow, the present disclosure is described in detail by describing embodiments of the present inventive concept with reference to accompanying drawings. Like reference numerals given in the drawings indicate like components. When a component, device, element, or the like of the present disclosure is described as having a purpose or performing an operation, function, or the like, the component, device, or element should be considered herein as being "configured to" meet that purpose or perform that operation or function.

Figure 2:
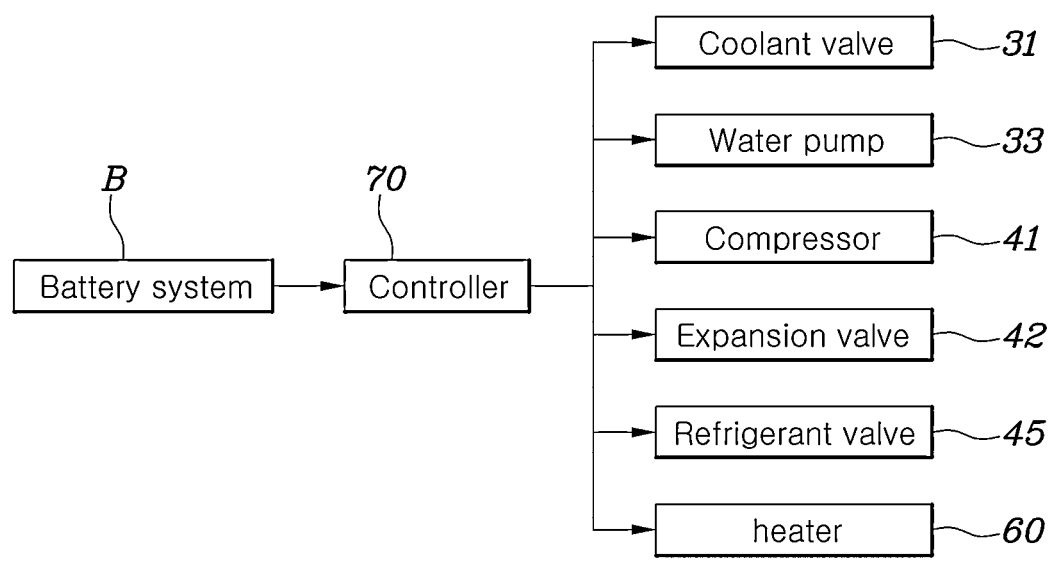
FIG. 2 is a block diagram of the coolant circulation system for a vehicle shown in FIG. 1.
Figure 3:
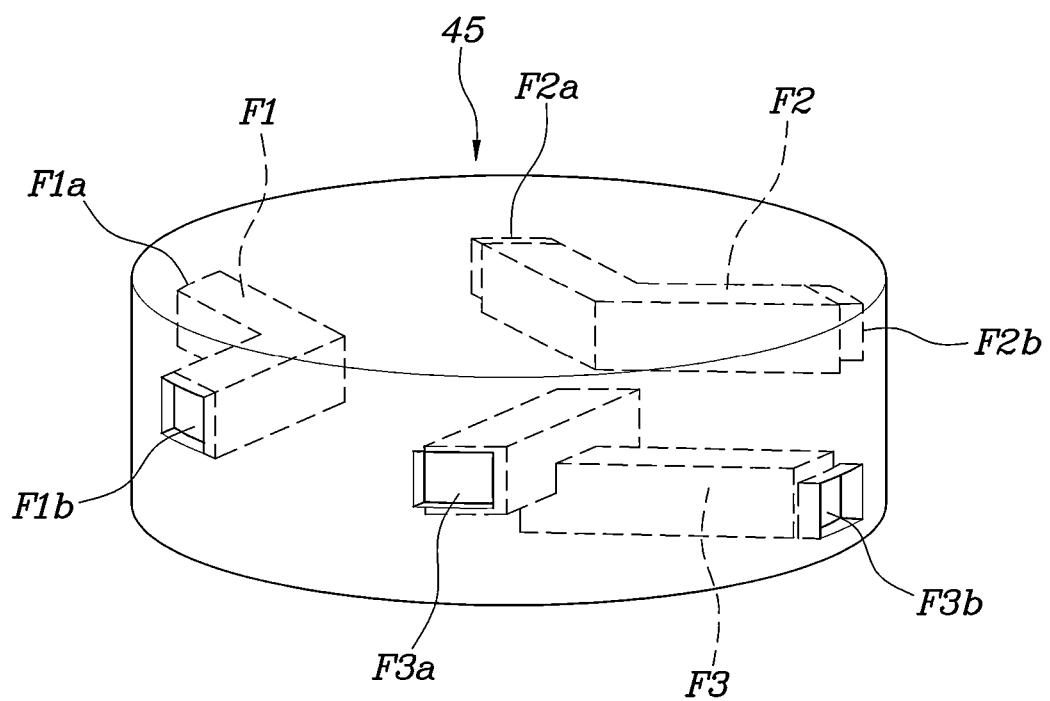
FIG. 3 is a view showing an embodiment of a refrigerant valve according to the present disclosure.
Figure 4:
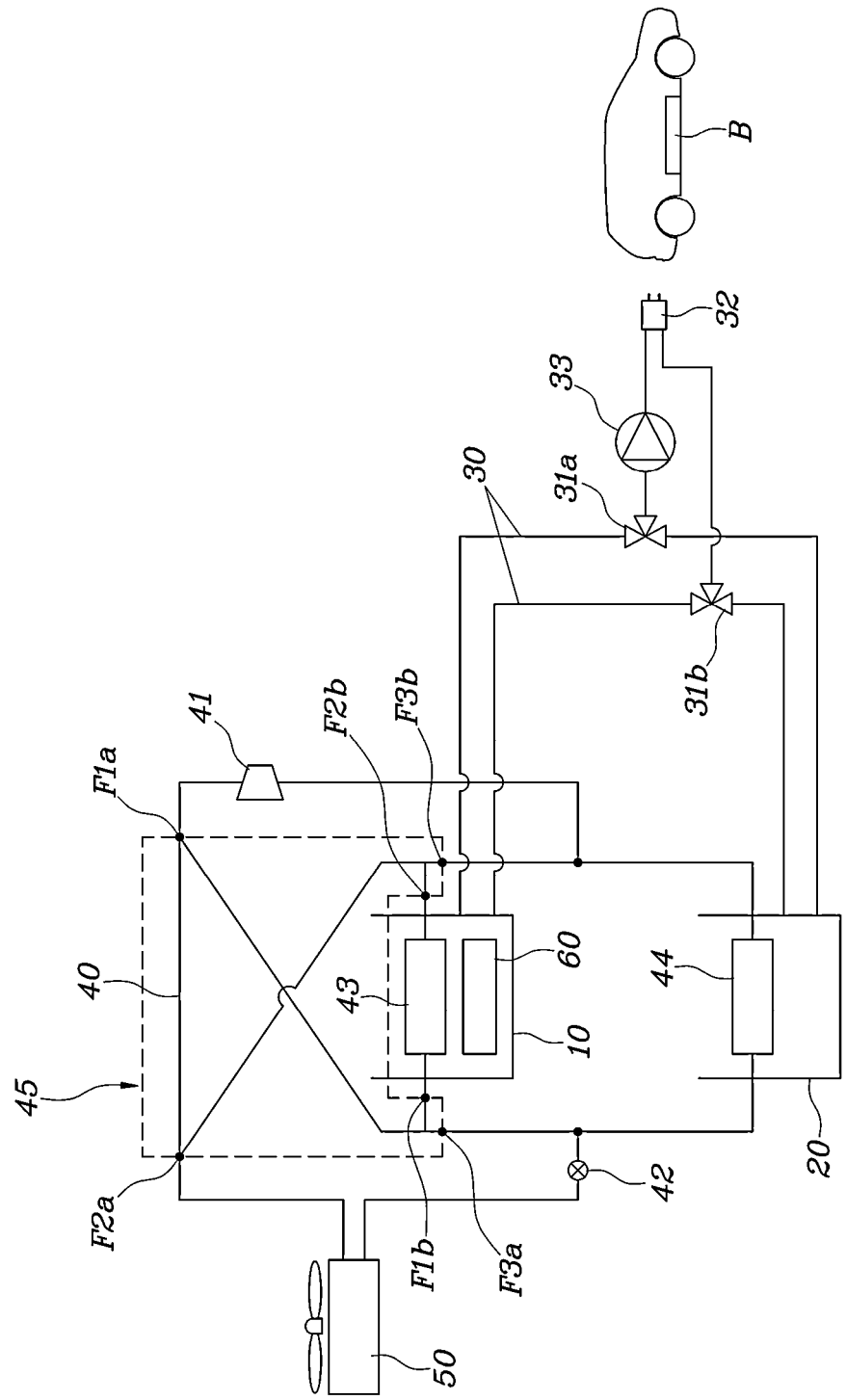
FIG. 4 is a view showing the coolant circulation system for a vehicle to which the refrigerant valve according to the present disclosure is applied.

FIG. 1 is a view showing a coolant circulation system for a vehicle according to the present disclosure. FIG. 2 is a block diagram of the coolant circulation system for a vehicle shown in FIG. 1. FIG. 3 is a view showing an embodiment of a refrigerant valve according to the present disclosure. FIG. 4 is a view showing the coolant circulation system for a vehicle to which the refrigerant valve according to the present disclosure is applied.

Figure 5:
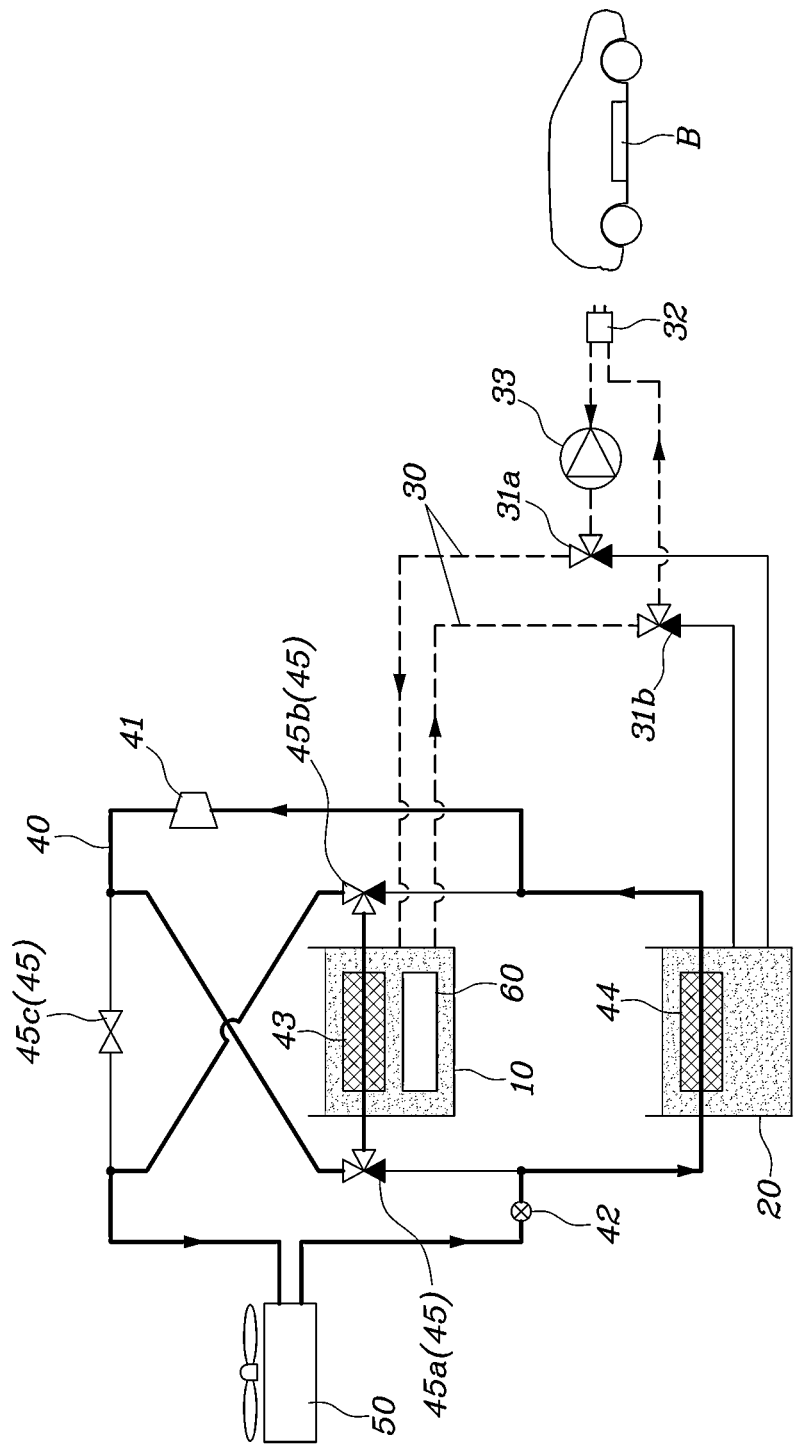
FIG. 5 is a view showing the coolant circulation system for a vehicle according to an embodiment of the present disclosure.
Figure 6:
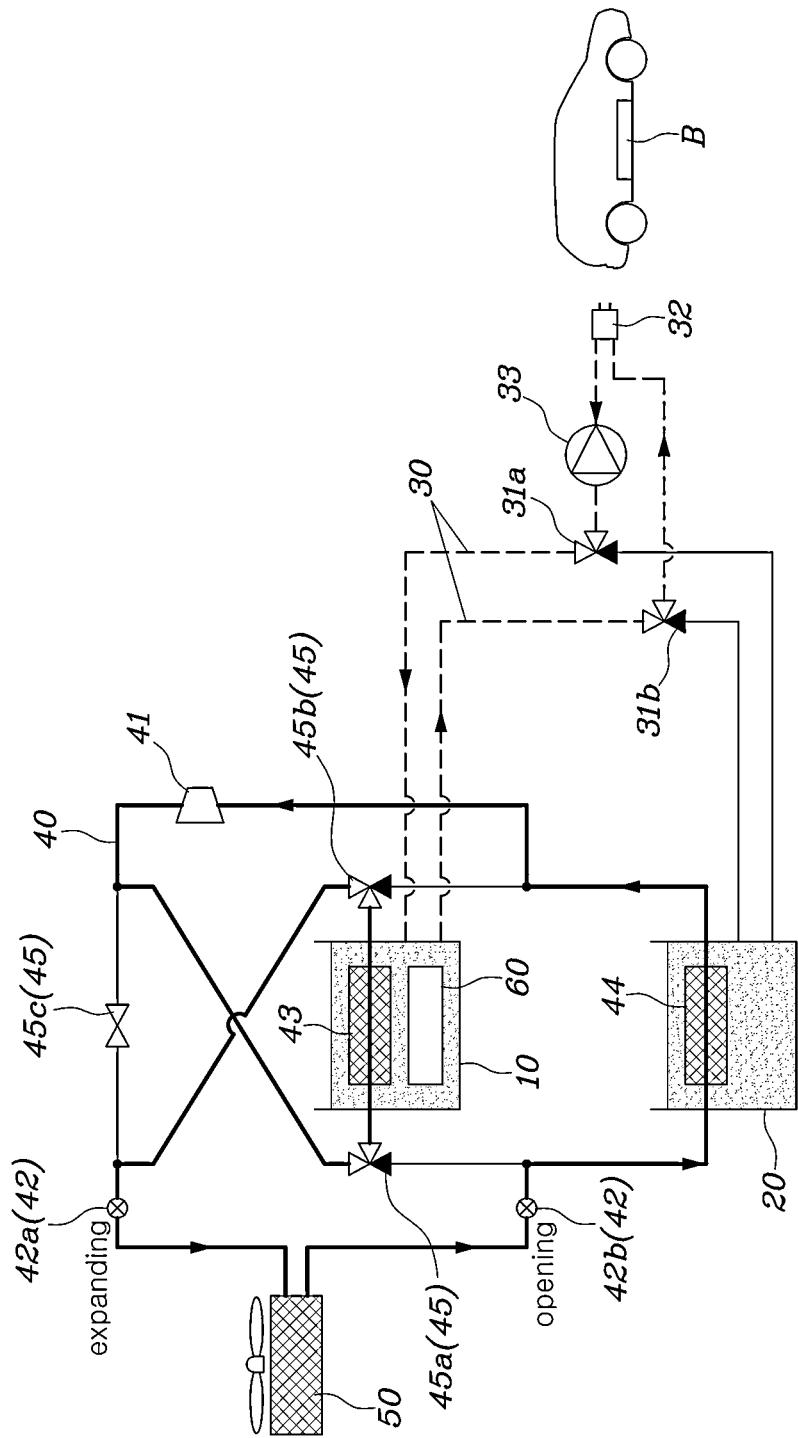
FIG. 6 is a view showing an embodiment with a plurality of expansion valves.

FIG. 5 is a view showing the coolant circulation system for a vehicle according to an embodiment of the present disclosure. FIG. 6 is a view showing an embodiment with a plurality of expansion valves.

Figure 7:
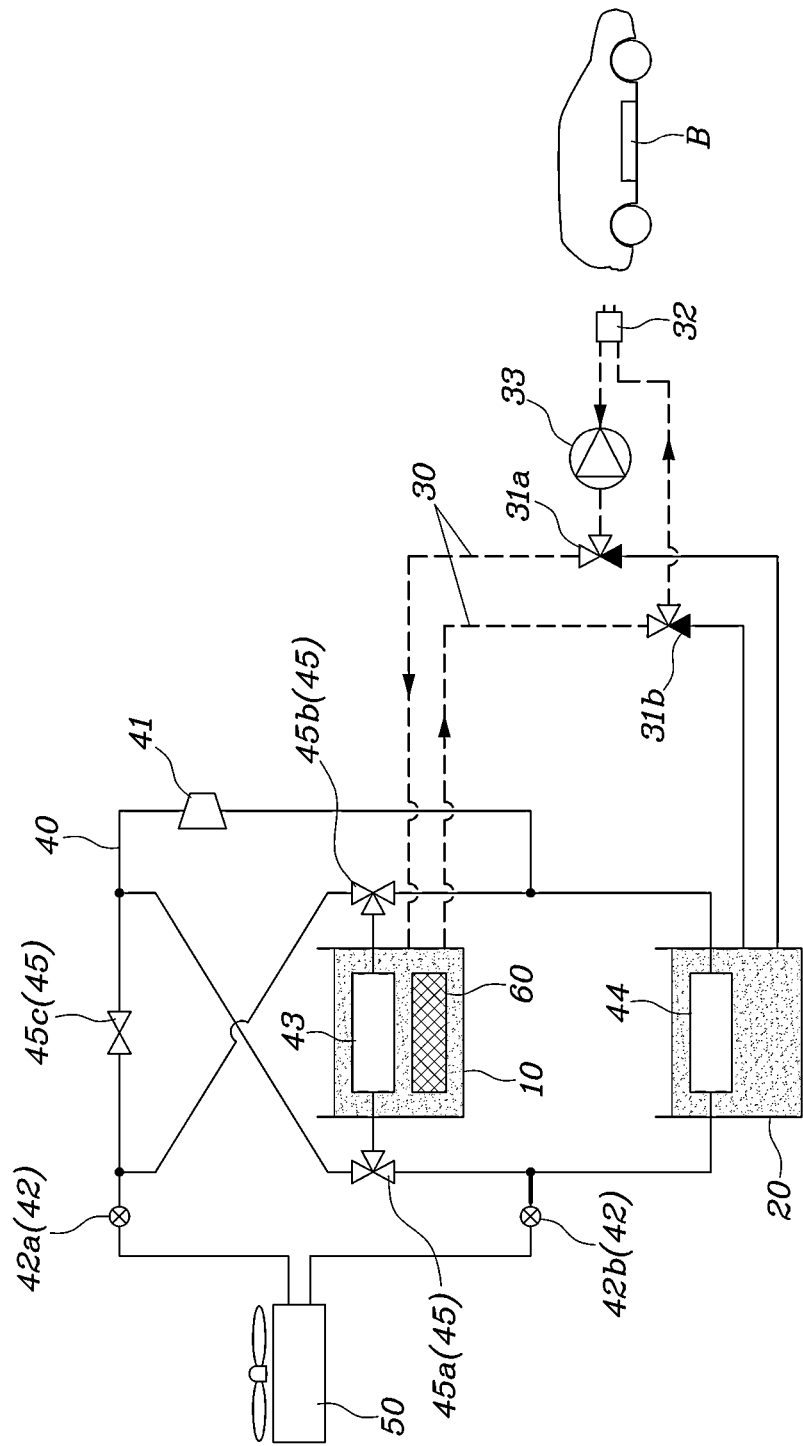
FIG. 7 is a view showing the coolant circulation system for a vehicle according to another embodiment of the present disclosure.

FIG. 7 is a view showing the coolant circulation system for a vehicle according to another embodiment of the present disclosure.

Figure 8:
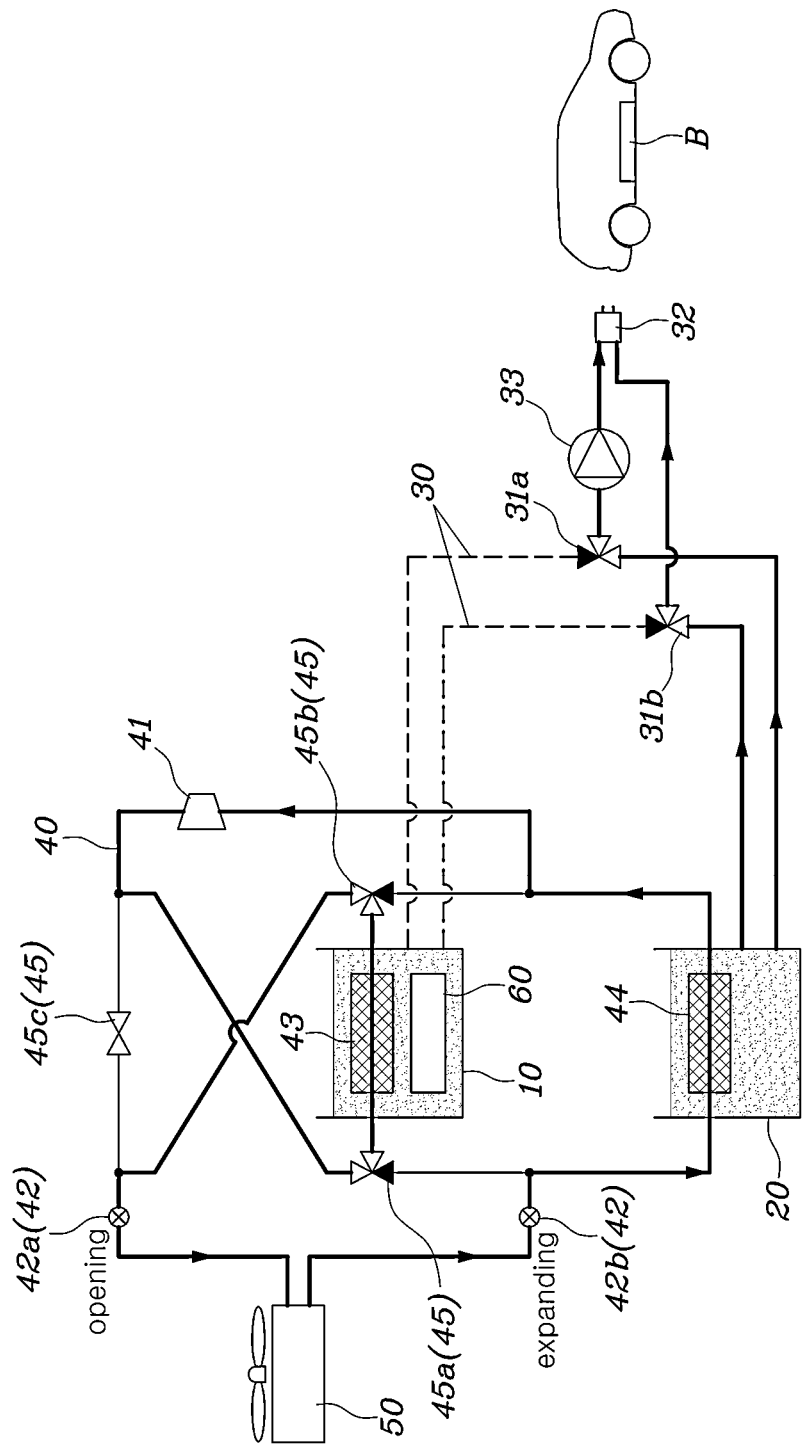
FIG. 8 is a view showing the coolant circulation system for a vehicle according to a further embodiment of the present disclosure.

FIG. 8 is a view showing the coolant circulation system for a vehicle according to a further embodiment of the present disclosure.

Figure 9:
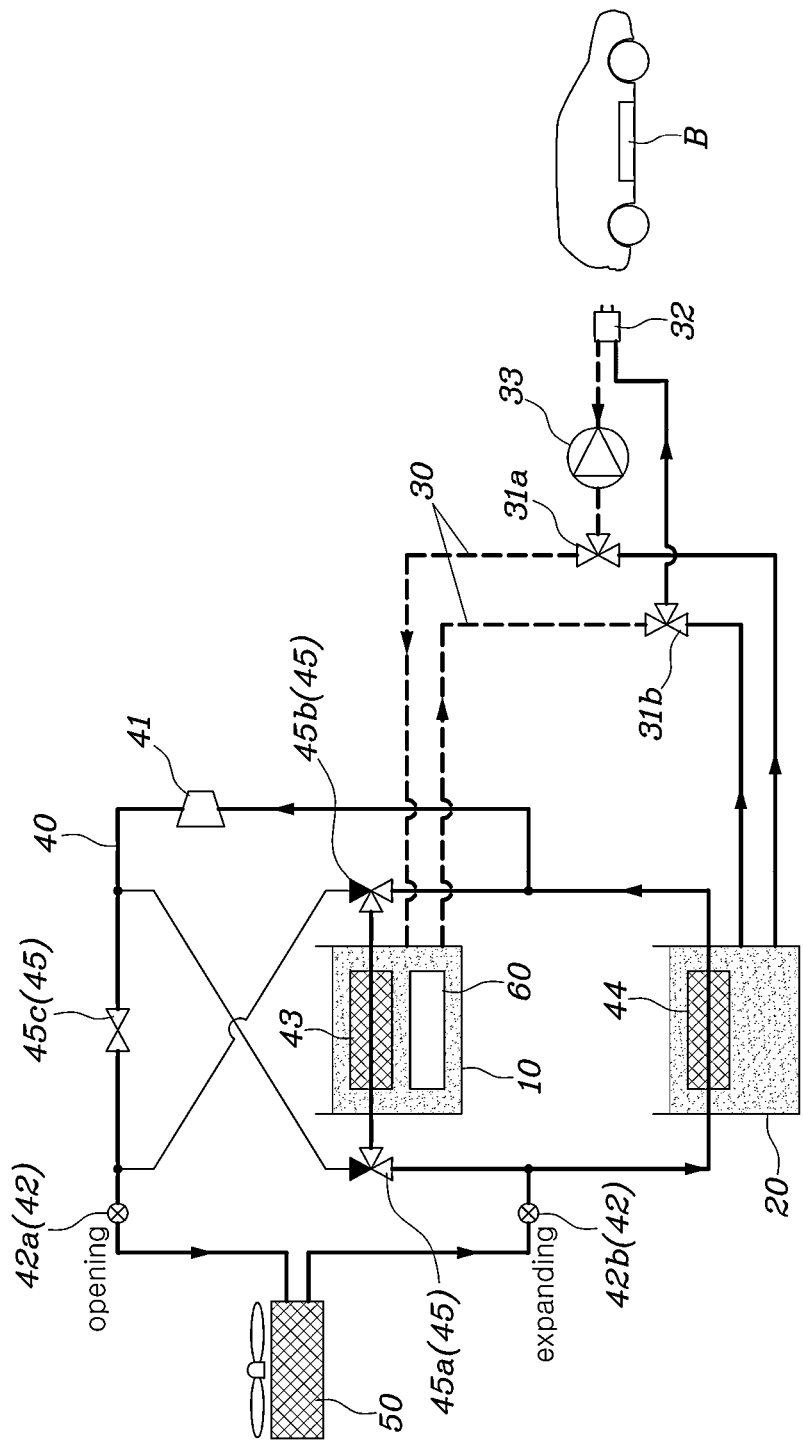
FIG. 9 is a view showing the coolant circulation system for a vehicle according to a further embodiment of the present disclosure.

FIG. 9 is a view showing the coolant circulation system for a vehicle according to a further embodiment of the present disclosure.

According to the present disclosure, as shown in FIGS. 1 and 2, a coolant circulation system for a vehicle includes a heating tank 10 and a cooling tank 20 that store coolant therein. The system also includes a coolant line 30 selectively connected to a battery system B of the vehicle and sharing the coolant in both the heating tank 10 and the cooling tank 20. The coolant line 30 includes a coolant valve 31 selectively supplying the coolant in both the heating tank 10 and the cooling tank 20 to the battery system B. The cooling circulation system further includes a refrigerant line 40 in which the refrigerant is circulated. The refrigerant line 40 includes a compressor 41, an expansion valve 42, a heating core 43 provided in the heating tank 10, a cooling core 44 provided in the cooling tank 20, and a refrigerant valve 45 changing a flow direction of the refrigerant.

In a case of electric vehicles, power of a battery is recharged using a fast battery charger located outside a vehicle. Reducing a fast charging time of electric vehicles is a very important commercial feature. During fast charging, the amount of charging current may be increased when the battery is heated to a predetermined temperature or higher. After the battery reaches the predetermined temperature or higher, the temperature of the battery is increased due to self-heating, so fast cooling of the battery is required. However, in order to heat and cool the battery in the vehicle, the vehicle needs a high-capacity heater and a compressor 41. In terms of capacity limitations and cost reduction, it is not desirable to provide the above parts in the vehicle. If the above parts are mounted to the vehicle, even when the battery is not being charged, the fuel efficiency of the vehicle is adversely affected due to the heavy weight of the above parts.

Therefore, according to an embodiment of the present disclosure, the coolant circulation system for vehicle is configured to supply heated or cooled coolant to the coolant line of the vehicle battery when the vehicle battery is charged. Therefore, depending on the environment inside and outside the vehicle, in a severe cold condition, the coolant circulation system heats the battery at an initial time of battery charging to increase the charging efficiency. After the battery is sufficiently heated, the battery is cooled to prevent the temperature thereof from being increased more, Additionally, in a severe hot condition, the battery is cooled to prevent overheating of the battery to increase the charging efficiency and to prevent overheating of the battery.

Therefore, the coolant circulation system of the present disclosure includes a controller 70 receiving a required coolant temperature of the battery system B and controlling the coolant valve 31, the expansion valve 42, and the refrigerant valve 45 to adjust the temperature of the coolant supplied to the battery system B of the vehicle.

Herein, the controller 70 may communicate with the vehicle and receive a required coolant temperature of the battery system B and may receive temperature information of the coolant stored in the heating tank 10 and the cooling tank 20 from temperature sensors provided in the heating tank 10 and the cooling tank 20.

Therefore, the controller 70 may adjust the temperature of the coolant supplied to the vehicle through the coolant line on the basis of the coolant temperature required from the battery system B of the vehicle. In other words, the controller 70 receives information about temperature after initial coolant intake of the vehicle, initial coolant temperature, outside temperature of vehicle, and battery state of charge (SOC) to determine the temperature of the coolant to be injected into the battery system B. Accordingly, cooled, or heated coolant is supplied into the battery system B of the vehicle so that charging efficiency of the battery can be improved.

Describing the coolant circulation system for a vehicle according to the present disclosure in detail, the coolant line includes a coupling part 32 connected to the battery system B of the vehicle, and a water pump 33 circulating the coolant.

Herein, the coupling part 32 is connected to the vehicle together with the fast battery charger. When the coupling part 32 is connected to the vehicle, the coolant in the battery system B and the coolant in both the heating tank 10 and the cooling tank 20 are combined with each other. Therefore, the battery system B of the vehicle may be supplied with the coolant of an optimum temperature required for optimization of the battery system B by the heating tank 10 or the cooling tank 20.

Furthermore, the coolant valve 31 may include a first coolant valve 31a and a second coolant valve 31b that allow the coolant to selectively flow from the heating tank 10 or the cooling tank 20 to the coupling part 32.

In other words, the coolant line 30 diverges into inlet side and outlet side of the heating tank 10 and inlet side and outlet side of the cooling tank 20. The coolant line 30 includes the first coolant valve 31a and the second coolant valve 31b so that the coolant in the heating tank 10 and the coolant in the cooling tank 20 may be selectively supplied into the battery system B of the vehicle. Herein, each of the first coolant valve 31a and the second coolant valve 31b may be a 3-way valve and may be replaced with an integrated valve.

As described above, in the coolant line 30 according to the present disclosure, the coolant flows from the water pump 33 to the coupling part 32 while passing through the heating tank or the cooling tank 20. The coolant with temperature adjusted in the heating tank 10 or the cooling tank 20 selectively flows to the coupling part 32 by the coolant valve 31.

Meanwhile, the refrigerant line 40 may include an external heat exchanger 50 heat-exchanging with outside air. The external heat exchanger 50 may be configured to heat-exchange with outside air by operating a radiator fan. The external heat exchanger 50 may be configured to adjust the temperature of the refrigerant to implement a heat pump.

Therefore, the refrigerant line 40 is configured to recirculate the refrigerant from the compressor 41 through the heating core 43 or the external heat exchanger 50, the expansion valve 42, and the cooling core 44 to the compressor 41.

In other words, in response to the temperature of the coolant to be supplied to the coolant line 30 or a heating/cooling mode of the battery, the refrigerant line 40 may cool the coolant in the cooling tank 20 or heat the coolant in the heating tank while the refrigerant is compressed by the compressor 41, condensed by the heating core 43 or the external heat exchanger 50, expanded by the expansion valve 42, and evaporated by the cooling core 44.

Herein, the refrigerant valve 45 is a 6-way valve and may switch a flow of the refrigerant that has passed through the compressor 41 selectively into the heating core 43, the cooling core 44, and the external heat exchanger 50.

In other words, according to an embodiment of the present disclosure, as the refrigerant is selectively circulated from the compressor 41 to the heating core 43 or the external heat exchanger 50, the expansion valve 42, and the cooling core 44, the refrigerant valve 45 includes a plurality of refrigerant valves 45.

Therefore, the refrigerant valve 45 may include the plurality of refrigerant valves or be integrated into one refrigerant valve to realize various embodiments.

As an embodiment, as shown in FIGS. 3 and 4, the refrigerant valve 45 is a 6-way valve. The one refrigerant valve allows the refrigerant to selectively flow into the heating core 43, the external heat exchanger 50, the expansion valve 42, and the cooling core 44 to adjust the temperature of the refrigerant. Furthermore, the one refrigerant valve 45 may simplify a circuit of the refrigerant line 40 by switching a flow direction of the refrigerant.

In response to a rotated position of the refrigerant valve 45, the refrigerant valve 45 in one position allows the refrigerant to flow with respect to (e.g., between or into) the compressor 41 and the heating core 43 and to the heating core 43 and the external heat exchanger 50, and selectively prevents the refrigerant from flowing with respect to (e.g., between or into) the heating core 43 and the cooling core 44. In another position, the refrigerant valve 45 allows the refrigerant to flow with respect to (e.g., between or into) the compressor 41 and the external heat exchanger 50, and with respect to (e.g., between or into) the heating core 43 and the cooling core 44 and prevents the refrigerant from flowing with respect to (e.g., between or into) the compressor 41 and the heating core 43.

Therefore, the refrigerant valve 45 may have three flow paths, and any one of the three flow paths is formed with a step difference higher than the remaining two flow paths, so that the refrigerant valve 45 may be configured to prevent the refrigerant from flowing with respect to the one flow path when the refrigerant flows in the two flow paths. As shown in FIG. 3, the refrigerant valve 45 includes a first flow path F1, a second flow path F2, and a third flow path F3. Thus, the refrigerant valve includes a first port F1a and a second port F1b corresponding to the first flow path F1, a third port F2a and a fourth port F2b corresponding to the second flow path F2, and a fifth port F3a and a sixth port F3b corresponding to the third flow path F3. When the refrigerant valve 45 is applied to the refrigerant line 40, as shown in FIG. 4, the refrigerant may selectively flow with respect to the compressor 41 and the heating core 43, to the heating core 43 and the external heat exchanger 50, and to the heating core 43 and the cooling core 44.

Therefore, as the refrigerant valve 45 changes a flow direction of the refrigerant only by one valve, the refrigerant valve 45 allows a flow of the coolant with respect to the compressor 41 and the heating core 43, and to the heating core 43 and the external heat exchanger 50 and prevents a flow of the coolant with respect to the heating core 43 and the cooling core 44. Thus, heat of the refrigerant is stored in the heating core 43 and a flow of the refrigerant is possible with respect to the external heat exchanger 50 and the cooling core 44, so that the temperature of the refrigerant may be managed. Furthermore, the refrigerant valve 45 allows a flow of the refrigerant with respect to the compressor 41 and the external heat exchanger 50, and to the heating core 43 and the cooling core 44 and prevents a flow of the refrigerant with respect to the compressor 41 and the heating core 43. Thus, the external heat exchanger 50 acts as a condenser, and the heating core 43 and the cooling core 44 act as evaporators, thereby cooling the coolant stored in the heating tank 10 and the cooling tank 20.

Meanwhile, according to another embodiment of the refrigerant valve 45, the refrigerant valve 45 may include a first refrigerant valve 45a, a second refrigerant valve 45b, and a third refrigerant valve 45c. The first refrigerant valve 45a may change a flow of the refrigerant between the compressor 41, the expansion valve 42, and the heating core 43. The second refrigerant valve 45b may change a flow of the refrigerant between the heating core 43, the external heat exchanger 50, and the compressor 41. The third refrigerant valve 45c may allow a flow of the refrigerant between the compressor 41 and the external heat exchanger 50.

As shown in FIG. 1, as the refrigerant valve 45 includes the first refrigerant valve 45a, the second refrigerant valve 45b, and the third refrigerant valve 45c, the degree of freedom in installation of the refrigerant line 40 may be secured. Herein, as the first refrigerant valve 45a changes a flow of the refrigerant between the compressor 41, a first expansion valve 42a, and the heating core 43, the refrigerant that has passed through the compressor 41 may selectively flow into the external heat exchanger 50 or the heating core 43. Furthermore, as the second refrigerant valve 45b changes a flow of the refrigerant between the heating core 43, the external heat exchanger 50, and the compressor 41, the refrigerant that has passed through the heating core 43 may be heat-exchanged through the external heat exchanger 50 or may flow into the compressor 41. As the third refrigerant valve 45c selectively allows a flow of the refrigerant between the compressor 41 and the external heat exchanger 50, the refrigerant may selectively bypass the heating core 43. Therefore, each of the first refrigerant valve 45a and the second refrigerant valve 45b may be a 3-way valve, and the third refrigerant valve 45c may be a 2-way valve.

Meanwhile, the expansion valve 42 may include the first expansion valve 42a arranged between the compressor 41 and the external heat exchanger 50 and may include a second expansion valve 42b arranged between the external heat exchanger 50 and the cooling core 44.

As described above, the expansion valve 42 includes the first expansion valve 42a and the second expansion valve 42b, thereby realizing a heat pump by the external heat exchanger 50, the heating core 43, and the cooling core 44.

As an example, when the first expansion valve 42a performs an expanding operation, the refrigerant that has passed through the compressor 41 supplies heat to the coolant in the heating tank 10 at the heating core 43. Also, the external heat exchanger 50 absorbs outside heat by the expanding operation of the first expansion valve 42a. Herein, the second expansion valve 42b is opened to increase heat storage effect of the coolant by the heating core 43 during recirculation of the refrigerant. As described above, the heat pump may be realized by the first expansion valve 42a and the second expansion valve 42b. Control of the first expansion valve 42a and the second expansion valve 42b is described in detail below.

Meanwhile, the heating tank 10 may include a heater 60 heating the coolant. Herein, the heater 60 may be a positive temperature coefficient (PTC) heater. When it is difficult for the heating core 43 to increase the temperature of the coolant therein to a required temperature, the heater 60 may be operated with the heating core 43 to increase the temperature of the coolant.

According to the present disclosure described above, the coolant circulation system for vehicle may control a flow of the refrigerant and a flow of the coolant in response to various modes depending on a coolant temperature required from the battery system B.

As an example, when the battery system B of the vehicle requires an increase in the temperature of the coolant, the controller 70 circulates the coolant in the heating tank 10. Thus, the coolant in the heating tank 10 is heated by the heating core 43 and the heated coolant is supplied to the battery system B.

Herein, the controller 70 may be controlled according to each embodiment of the expansion valve 42 as follows.

In other words, when the expansion valve 42 includes one expansion valve, as shown in FIG. 5, the controller 70 controls the refrigerant valve 45 to generate a refrigerant cycle in which the refrigerant is compressed in the compressor 41 and condensed in the heating core 43. This increases the temperature of the coolant in the heating tank 10 and the refrigerant is expanded by the expansion valve 42 through the external heat exchanger 50 and is evaporated in the cooling core 44 to cool the coolant in the cooling tank 20. Herein, the temperature of the coolant in the heating tank 10 may be adjusted as the heater 60 is operated. Furthermore, the coolant valve 31 of the coolant line 30 allows the coolant with increased temperature in the heating tank 10 to be supplied to the battery system B. The battery system B may perform coolant temperature management optimized in a charging condition.

Herein, when the expansion valve 42 includes a plurality of expansion valves, as shown in FIG. 6, the controller 70 controls the refrigerant valve 45 so that the refrigerant is compressed in the compressor 41 and is condensed in the heating core 43 to increase the temperature of the coolant in the heating tank 10. The refrigerant is evaporated in the external heat exchanger 50 by an expanding operation of the first expansion valve 42a to absorb heat of outside air. Furthermore, when the second expansion valve 42b performs an opening operation, it is possible to realize the heat pump in which the refrigerant is heat-exchanged with the cooling core 44 and then is recirculated to the compressor 41.

In a situation where the battery system B of the vehicle described above requires an increase in temperature of the coolant, the rise in temperature of the coolant may be performed when the temperature of the coolant in the cooling tank 20 is equal to or higher than a preset temperature. Herein, the preset temperature may be 0° C. When the temperature of the coolant in the cooling tank 20 is equal to or higher than 0° C., storage of cold due to evaporation of the refrigerant in the cooling core 44 is allowed or possible, and it is desirable to satisfy the above condition.

Meanwhile, as shown in FIG. 7, when the battery system B of the vehicle requires an increase in temperature of the coolant and the temperature of the coolant in the cooling tank 20 is less than the preset temperature, the controller 70 limits circulation of the refrigerant in the refrigerant line 40, operates the heater 60, and allows the heated coolant in the heating tank 10 to be supplied to the battery system B.

Herein, the preset temperature may be 0° C., and when the temperature of the coolant in the cooling tank 20 is less than 0° C., the cooling core 44 does not evaporate the refrigerant so that circulation of the refrigerant in the refrigerant line 40 is limited. The coolant in the heating tank 10 is heated by operating the heater 60 and the coolant valve 31 of the coolant line 30 allows the coolant with increased temperature in the heating tank 10 to be supplied to the battery system B, thereby supplying the heated coolant required from the battery system B.

As another embodiment, when the battery system B of the vehicle requires heated coolant and cooled coolant, the controller 70 circulates the refrigerant in the refrigerant line so that the coolant in the heating tank 10 is heated by the heating core 43 and the coolant in the cooling tank 20 is cooled by the cooling core 44. The controller 70 selectively supplies the coolant in the heating tank 10 or the coolant in the cooling tank 20 in response to a temperature of the coolant required from the battery system B.

As shown in FIG. 8, the controller 70 controls the refrigerant valve 45 to generate a refrigerant cycle in which the refrigerant is compressed in the compressor 41 and is condensed in the heating core 43 so as to increase the temperature of the coolant in the heating tank 10 and the refrigerant is expanded in the expansion valve 42 while passing through the external heat exchanger 50 and is evaporated in the cooling core 44 to cool the coolant in the cooling tank 20. Herein, the temperature of the coolant in the heating tank 10 may be adjusted as the heater 60 is operated. Furthermore, the coolant valve 31 in the coolant line 30 mixes the heated coolant in the heating tank 10 and the cooled coolant in the cooling tank 20 with each other in response to a coolant temperature required from the battery system B. The coolant valve 31 supplies the mixed coolant to the battery system B so that the battery system B may perform the coolant temperature management optimized for a charging condition.

In this case, when the expansion valve 42 includes a plurality of expansion valves, the first expansion valve 42a is opened and the second expansion valve 42b performs an expanding operation. This refrigerant cycle is the same as the single expansion valve 42.

Meanwhile, as another embodiment, when the battery system B of the vehicle requires a cooling in temperature of the coolant, the controller 70 circulates the refrigerant in the refrigerant line 40 so that the coolant in the heating tank 10 and the coolant in the cooling tank 20 are cooled by the heating core 43 and the cooling core 44, respectively, and the cooled coolant is supplied to the battery system B.

As shown in FIG. 9, the controller 70 controls the refrigerant valve 45 to generate a coolant cycle in which the refrigerant is compressed in the compressor 41, bypasses the heating core 43 and is condensed in the external heat exchanger 50, is expanded in the expansion valve 42, and is evaporated in the cooling core 44, thereby cooling the coolant in the cooling tank 20. Specifically, in a situation such as summer when an increase in temperature of the battery system B is not required, the battery system requires only the cooled coolant. The controller 70 controls the refrigerant valve 45 to allow the refrigerant that has been expanded in the expansion valve 42 to flow into the heating core 43 to evaporate the refrigerant in the heating core 43. Therefore, the coolant in the heating tank 10 and the coolant in the cooling tank 20 are cooled by the heating core 43 and the cooling core 44, respectively. The coolant valve 31 of the coolant line 30 supplies the coolant cooled in the heating tank 10 and the coolant cooled in the cooling tank 20 to the battery system B. Thus, the battery system B may perform the coolant temperature management optimized for a charging condition.

In this case, even when the expansion valve 42 includes the plurality of expansion valves, the first expansion valve 42a is opened and the second expansion valve 42b performs an expanding operation. The refrigerant cycle is the same as the single expansion valve 42.

The coolant circulation system for a vehicle, which is configured as described above, is configured to be connected to a high voltage battery of an electric vehicle to combine coolant managed outside the vehicle and coolant circulated in the high voltage battery of the electric vehicle with each other. This is done for the heat management of the high voltage battery equipped in the electric vehicle, and to supply the cooled or heated coolant to the high voltage battery. Thus, the charging efficiency is improved by the temperature management of the high voltage battery when the high voltage battery is charged.

Although several embodiments of the present disclosure have been disclosed for illustrative purposes, those of ordinary skill in the art should appreciate that various modifications, additions, and substitutions are possible, without departing from the spirit and scope of the present inventive concept.

What is claimed is:

1. A coolant circulation system for a vehicle, the coolant circulation system comprising:
    a heating tank and a cooling tank that are configured to store coolant therein;
    a coolant line configured to be selectively connected to a battery system of the vehicle and to supply the coolant in both the heating tank and the cooling tank to the battery system, the coolant line including a coolant valve configured to selectively supply the coolant in both the heating tank and the cooling tank to the battery system; and
    a refrigerant line in which refrigerant is circulated, the refrigerant line including a compressor, an expansion valve, a heating core provided in the heating tank, a cooling core provided in the cooling tank, and a refrigerant valve configured to change a flow direction of the refrigerant,
    wherein the refrigerant line further includes an external heat exchanger configured to perform heat exchange with outside air, and
    wherein the refrigerant valve is a 6-way valve and is configured to change a flow of the refrigerant so that the refrigerant that has passed through the compressor selectively flows into one or more of the heating core, the cooling core, and the external heat exchanger.

2. The coolant circulation system of claim 1, wherein the coolant line further comprises a coupling part connected to the battery system of the vehicle and a water pump configured to circulate the coolant.

3. The coolant circulation system of claim 2, wherein the coolant line is configured to allow the coolant to flow to the coupling part by passing through the heating tank or the cooling tank from the water pump.

4. The coolant circulation system of claim 2, wherein the coolant valve comprises a first coolant valve and a second coolant valve that are configured to allow the coolant to selectively flow from the heating tank or the cooling tank to the coupling part.

5. The coolant circulation system of claim 1, wherein the refrigerant line is configured to allow the refrigerant to pass through the heating core or the external heat exchanger, the expansion valve, and the cooling core from the compressor and to be recirculated to the compressor.

6. The coolant circulation system of claim 1, wherein, in response to a rotation position of the refrigerant valve, the refrigerant valve allows the refrigerant to flow into the compressor and the heating core, and into the heating core and the external heat exchanger and prevents the refrigerant from flowing into the heating core and the cooling core, or the refrigerant valve allows the refrigerant to flow into the compressor and the external heat exchanger, and into the heating core and the cooling core and prevents the refrigerant from flowing into the compressor and the heating core.

7. The coolant circulation system of claim 1, wherein the refrigerant valve comprises a first refrigerant valve configured to change a flow of the refrigerant between the compressor, the expansion valve, and the heating core, a second refrigerant valve configured to change a flow of the refrigerant between the heating core, the external heat exchanger, and the compressor, and a third refrigerant valve configured to allow a flow of the refrigerant between the compressor and the external heat exchanger.

8. The coolant circulation system of claim 1, wherein the expansion valve comprises a first expansion valve arranged between the compressor and the external heat exchanger, and a second expansion valve arranged between the external heat exchanger and the cooling core.

9. The coolant circulation system of claim 1, wherein the heating tank further comprises a heater configured to heat the coolant.

10. The coolant circulation system of claim 1, further comprising:
    a controller configured to receive a coolant required temperature of the battery system, to control the coolant valve, the expansion valve, and the refrigerant valve, and to adjust temperature of the coolant supplied to the battery system of the vehicle.

11. The coolant circulation system of claim 10, wherein, when the battery system of the vehicle requires an increase in temperature of the coolant, the controller circulates the refrigerant of the refrigerant line, so that the coolant in the heating tank is heated by the heating core and the heated coolant is supplied to the battery system.

12. The coolant circulation system of claim 11, wherein, when temperature of the coolant in the cooling tank is equal to or higher than a preset temperature, the controller allows the battery system of the vehicle to perform a control according to the increase in temperature of the coolant.

13. The coolant circulation system of claim 10, wherein the heating tank further comprises a heater configured to heat the coolant, and
    wherein, when the battery system of the vehicle requires an increase in a temperature of the coolant and a temperature of the coolant in the cooling tank is less than a preset temperature, the controller limits circulation of the refrigerant in the refrigerant line, operates the heater, and supplies heated coolant in the heating tank to the battery system.

14. The coolant circulation system of claim 10, wherein, when the battery system of the vehicle requires heated coolant and cooled coolant, the controller circulates the refrigerant of the refrigerant line to heat the coolant in the heating tank by the heating core, and to cool the coolant in the cooling tank by the cooling core, and the controller selectively supplies the coolant in the heating tank or the cooling tank in response to a required coolant temperature of the battery system.

15. The coolant circulation system of claim 10, wherein, when the battery system of the vehicle requires a cooling of the coolant, the controller circulates the refrigerant of the refrigerant line, so that the coolant in the heating tank and the coolant in the cooling tank are cooled by the heating core and the cooling core, respectively, and the cooled coolant is supplied to the battery system.

16. A coolant circulation system for a vehicle, the coolant circulation system comprising:
   a heating tank and a cooling tank that are configured to store coolant therein;
   a coolant line configured to be selectively connected to a battery system of the vehicle and to supply the coolant in both the heating tank and the cooling tank to the battery system, the coolant line including a coolant valve configured to selectively supply the coolant in both the heating tank and the cooling tank to the battery system;
   a refrigerant line in which refrigerant is circulated, the refrigerant line including a compressor, an expansion valve, a heating core provided in the heating tank, a cooling core provided in the cooling tank, and a refrigerant valve configured to change a flow direction of the refrigerant; and
   a controller configured to receive a coolant required temperature of the battery system, to control the coolant valve, the expansion valve, and the refrigerant valve, and to adjust temperature of the coolant supplied to the battery system of the vehicle,
   wherein, when the battery system of the vehicle requires heated coolant and cooled coolant, the controller circulates the refrigerant of the refrigerant line to heat the coolant in the heating tank by the heating core and to cool the coolant in the cooling tank by the cooling core, and
   wherein the controller selectively supplies the coolant in the heating tank or the cooling tank in response to a required coolant temperature of the battery system.

17. A coolant circulation system for a vehicle, the coolant circulation system comprising:
   a heating tank and a cooling tank that are configured to store coolant therein;
   a coolant line configured to be selectively connected to a battery system of the vehicle and to supply the coolant in both the heating tank and the cooling tank to the battery system, the coolant line including a coolant valve configured to selectively supply the coolant in both the heating tank and the cooling tank to the battery system;
   a refrigerant line in which refrigerant is circulated, the refrigerant line including a compressor, an expansion valve, a heating core provided in the heating tank, a cooling core provided in the cooling tank, and a refrigerant valve configured to change a flow direction of the refrigerant; and
   a controller configured to receive a coolant required temperature of the battery system, to control the coolant valve, the expansion valve, and the refrigerant valve, and to adjust temperature of the coolant supplied to the battery system of the vehicle,
   wherein, when the battery system of the vehicle requires a cooling of the coolant, the controller circulates the refrigerant of the refrigerant line, so that the coolant in the heating tank and the coolant in the cooling tank are cooled by the heating core and the cooling core, respectively, and the cooled coolant is supplied to the battery system.

* * * * *